United States Patent [19]
Silvera-Langley

[11] Patent Number: 6,067,698
[45] Date of Patent: May 30, 2000

[54] METHOD AND APPARATUS FOR SERVING FOOD UTILIZING A COMBINATION SERVING CRADLE AND TRIVET

[76] Inventor: Robin C. Silvera-Langley, 345 Denio Ave., Gilroy, Calif. 95020-9203

[21] Appl. No.: 09/244,688

[22] Filed: Feb. 4, 1999

Related U.S. Application Data

[63] Continuation of application No. 09/001,086, Dec. 30, 1997.

[51] Int. Cl.[7] ..................................................... B21P 39/03
[52] U.S. Cl. .............................. 29/428; 220/9.1; 220/9.4; 220/593.3
[58] Field of Search ................................ 29/428; 220/9.4, 220/9.1, 573.3

[56] References Cited

U.S. PATENT DOCUMENTS

| | | | |
|---|---|---|---|
| D. 258,631 | 3/1981 | Lax | D7/3 |
| 3,831,002 | 8/1974 | Mysicka et al. | 219/432 |
| 4,765,644 | 8/1988 | Bell | 280/641 |
| 5,772,236 | 6/1998 | Clark | 280/651 |

*Primary Examiner*—P. W. Echols
*Assistant Examiner*—John C. Hong
*Attorney, Agent, or Firm*—The Kline Law Firm

[57] ABSTRACT

A method and apparatus for serving food utilizing a combination serving cradle and trivet. The device includes handles that permit it to be easily carried without injury to the fingers. The device further includes support legs that raise the serving dish above the table surface to avoid possible damage to the table. In addition, a decorative and insulated fabric cover helps to retain temperatures of food stuffs while being served. The sling wrap design of the fabric cover allows a refrigerant or heating gel pack to be inserted between the fabric cover and the dish or receptacle to further maintain the temperature of the dish while it is being served.

3 Claims, 2 Drawing Sheets

METHOD AND APPARATUS FOR SERVING FOOD UTILIZING A COMBINATION SERVING CRADLE AND TRIVET

This application is a continuation of U.S. patent application Ser. No. 09/001,086, filed Dec. 30, 1997.

FIELD OF THE INVENTION

The present invention relates generally to cookware, and more particularly is an improved method and device for the handling and serving of hot or cold casserole dishes or cookware.

BACKGROUND OF THE INVENTION

Historically, insulated pads known as hot mats have been used in the serving of casserole dishes or cookware, (oven heated or refrigerated). The pads are generally square or round, and include some type of an insulation material. Additionally, in the past, cooks have used insulated gloves such as barbecue gloves. These mats and gloves are wrapped around the edge of a casserole to hold it when removing it from the oven and carrying it to the table.

When the hot casserole is placed on the table, it is normally desirable to have some type of insulated material between the casserole and the table to prevent burning and discoloration of the table surface. This is accomplished with trivets of various types which hold the casserole above the table, thereby allowing the hot dish to be readily accessible but out of direct contact with the table. While trivets are generally constructed from rigid materials, there are also fabric receptacles adapted to receive dishes. These receptacles sit directly on the table, separating the casserole from the table by only the fabric material.

One drawback in the prior art devices is that there is no provision made to help retain the serving temperature of the contents of the dish, whether hot or cold, during the time the dish is on the table.

Moreover, with the prior art receptacles being in direct contact with the table surface, the table surface is subjected to water damage due to the wetness or condensation from the dish being served.

Further, the prior art makes no mention of or provision for easing the passing of the dish to others seated around the table.

Accordingly, it is an object of the present invention to provide a method and apparatus for allowing both hot and cold cooking dishes to be easily an conveniently transported to the dining table.

It is a further object of the present invention to provide a means to protect the table surface from a hot or a cold dish placed on the serving table.

It is a still further object of the present invention to provide a means of easily passing the serving dish for serving diners.

It is another object of the present invention to provide a means to maintain the temperature of a dish.

It is a still further object of the present invention to provide a fabric cover to the device that can be easily replaced.

SUMMARY OF THE INVENTION

The present invention is a method and apparatus for serving food utilizing a combination serving cradle and trivet. The device includes handles that permit it to be easily carried without injury to the fingers. The device further includes support legs that raise the serving dish above the table surface to avoid possible damage to the table. In addition, a decorative and insulated fabric cover helps to retain temperatures of food stuffs while being served. The sling wrap design of the fabric cover allows a refrigerant or heating gel pack to be inserted between the fabric cover and the dish or receptacle to further maintain the temperature of the dish while it is being served.

An advantage of the present invention is that the dish being served can be placed on the table without the dish being in direct contact with the table surface.

Another advantage of the present invention is that it helps to maintain the temperature of the dish while it is being served.

A still further advantage of the present invention is that the appearance of the device can be quickly and easily changed by replacing the fabric cover.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

The present invention is a method and apparatus for placing hot and cold dishes on a dining table while removing the dish from direct contact with the table surface. The method utilizes a combination serving cradle and trivet. The trivet includes a main support frame 9 which is bent or molded to a shape that fits the size and shape desired by the user for the particular casserole or other serving dish. The main support frame 9 can be constructed by any method that yields a single unit with rigid support and holding members. Handles 8 are securely attached to ends of the support frame 9 so that the device can be easily carried and passed. Support legs 11 elevate an open area in the top of the main support frame 9 so that when the dish is placed in the main support frame 9, the dish is not in direct contact with the table surface.

Figure 1:
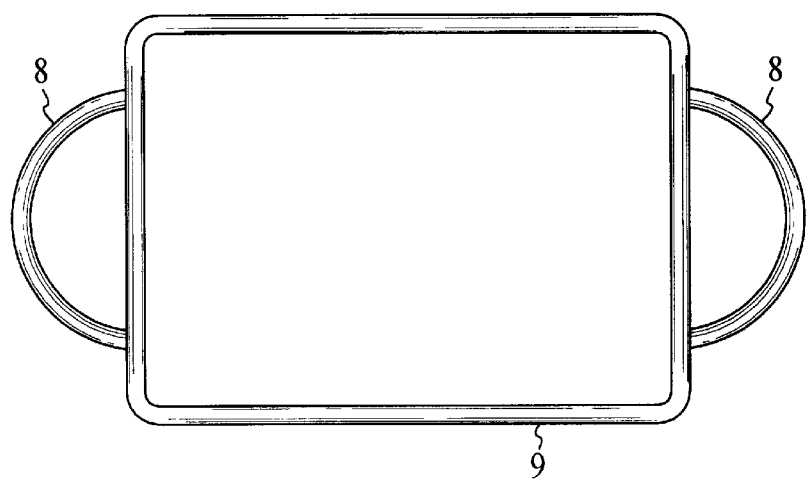
FIG. 1 shows a top view of the carrier and trivet.
Figure 2:
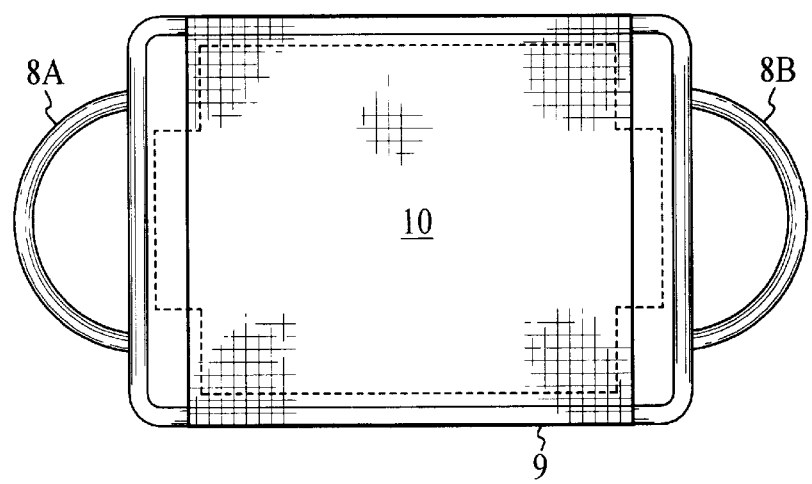
FIG. 2 shows a top view of the carrier with the cover in place, and with a dish placed in the support frame shown in phantom.

FIG. 2 illustrates a fabric cover 10 that is attached to the main support frame 9 by wrapping the cover 10 over the sides of the support frame 9. The cover 10 is secured to the support frame 9 by closure means 13 such as buttons, Velcro, snaps, or the like. A dish placed in the carrier and trivet is shown in phantom in FIG. 2.

Figure 3:
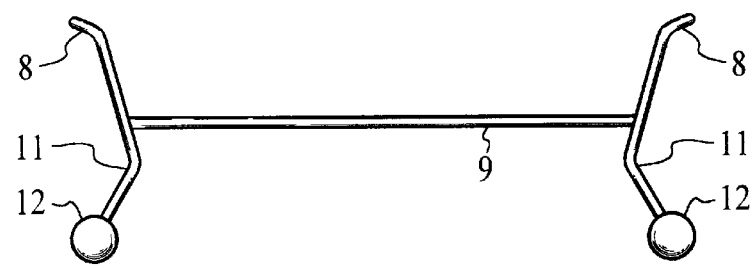
FIG. 3 shows a side view of the carrier and trivet.

FIG. 3 illustrates a side view of the main support frame 9 in which the handles 8 are bent outward from the support frame 9. This increases the distance between a user's hands and the supported dish so that injury to the user is less likely.

The support legs 11 are bent outward at an angle from the support frame 9 to provide additional stability for the carrier. FIG. 3 also illustrates decorative ball feet 12 placed on the support legs 11 of the main support frame 9.

Figure 4:
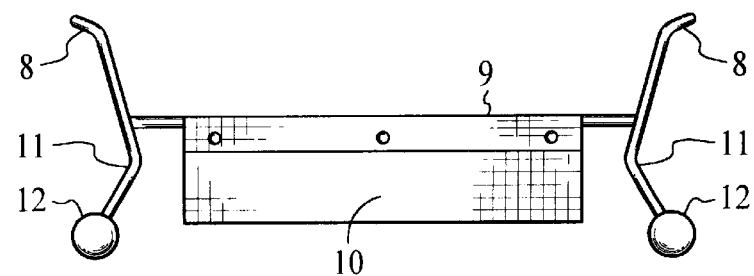
FIG. 4 shows a side view of the carrier with the fabric cover in place.
Figure 5:
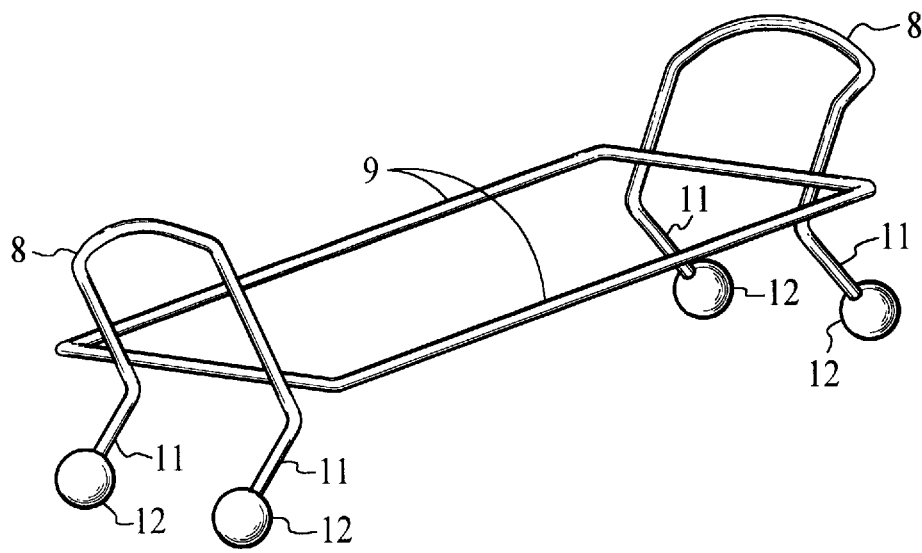
FIG. 5 shows a perspective view of carrier and trivet.
Figure 6:
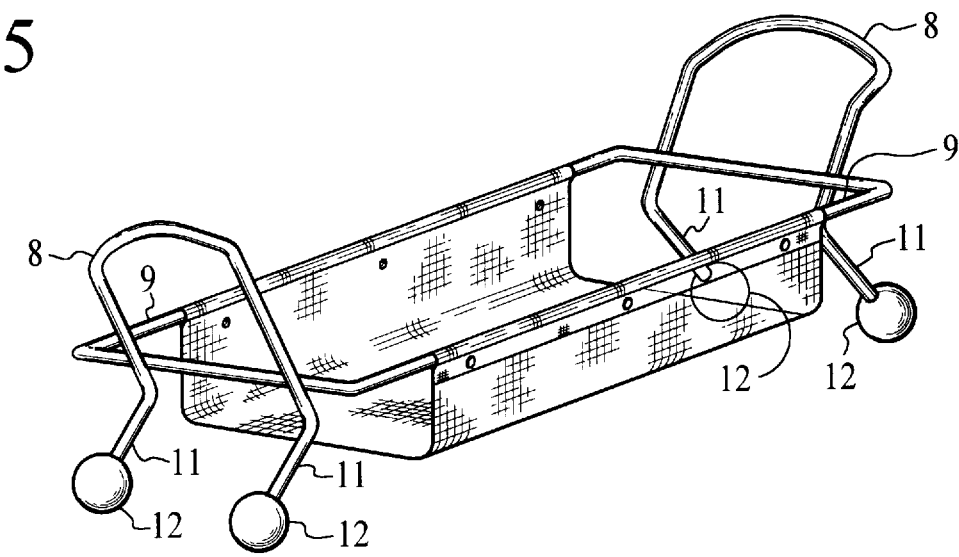
FIG. 6 shows a perspective view of the carrier and trivet with the fabric cover attached.
Figure 7:
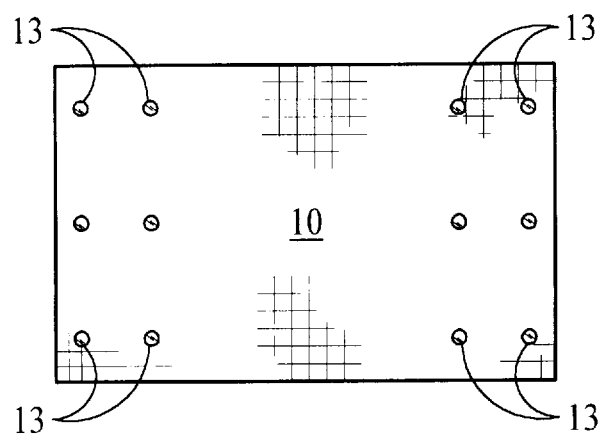
FIG. 7 shows the fabric cover with self closures.

FIG. 4 shows the fabric cover 10 attached to the carrier and trivet by closure means 13. The dotted line represents how a dish or receptacle pan would sit in the support frame 9. The ends of fabric cover 10 encircle the support frame 9. Closure means 13 are then engaged to hold the fabric cover 10 in place. The fabric cover 10 may be constructed of various decorative materials compatible with the decor of the area in which it is to be used. The covers are easily removed and replaced to modify the appearance of the device.

Use of the device is as follows: The fabric cover 10 is wrapped around and secured on the main plane of the support frame 9. The support frame 9 is shaped to hold the receptacle of choice securely while carrying and serving from the receptacle dish. In the preferred embodiment, the handles 8 and legs 11 are formed from a single continuous piece of material that extends above and below the main plane of the support frame 9. The single piece of material thereby forms both the handles 8 and the support legs 11. The handles 8 extend above the horizontal main plane of the support frame 9 so that a user can easily pick up the entire unit without having his hands contact the hot or cold receptacle.

The support legs 11 extend below the main plane of the support frame 9 to allow the bottom of the serving receptacle to be raised above the table surface. This allows the hot or cold dish to sit on the table without touching or damaging the table surface.

The fabric cover 10 is attached and removed by folding the ends of the cover 10 over the horizontal main plane of the frame 9 and securing the cover 10 in the frame 9 by closure means 13. With the cover 10 securely attached over support frame 9, a cradle is formed around the sides and bottom of the hot or cold receptacle. The cover 10 provides insulation to maintain the temperature of the receptacle. The cover 10 will also catch any spillage or condensation, thereby further protecting the table surface. The secured sling design allows the insertion of a refrigerant or heating pack that is inserted between the fabric cover 10 and the receptacle bottom. The packs further maintain temperature control of receptacle contents. The ability of the fabric cover 10 to be easily attached and removed allows ease of cleaning and laundering for sanitation purposes. The ease of changing the cover 10 allows change of fabric or textiles for decorative purposes. The decorative ball feet 12 help protect table surfaces from scratching, marring, and sliding.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A method of suspending cooking and serving receptacles above a supporting surface in a holder, said method comprising the steps of:

(a) forming a horizontal support frame from a rigid material, said support frame is formed so that an enclosure that is open on top and bottom sides is defined by an interior of said support frame, (b) connecting a plurality of elongated support members to said horizontal support frame so that said support members extend above and below said horizontal support frame, portions of said support members that extend below said horizontal support frame are of equal length so that said horizontal support frame is supported in a horizontal plane, (c) extending upper ends of opposing pairs of said elongated support members with transverse elements so as to form handle portions, said transverse elements are extensions of said support members so that said handle portions are integral to said support members, and (d) removably attaching a fabric cover to said horizontal support frame by wrapping two sides of said cover around opposing segments of said horizontal support frame and securing said two sides of said cover to a body of said cover with releasable attaching means, said cover thereby forming a receiving area for the cooking and serving receptacles, said receiving area being suspended from said horizontal support frame, the length of said portions of said support members that extend below said horizontal support frame being sufficient to suspend the cooking and serving receptacles above the supporting surface.

2. The method of claim 1 wherein:

a heat producing pack is placed between said fabric cover and a bottom of the cooking and serving receptacles.

3. The method of claim 1 wherein:

a heat removing pack is placed between said fabric cover and a bottom of the cooking and serving receptacles.

* * * * *